Jan. 20, 1959
D. I. DOYLE, JR
2,869,885
RIGID AXLE MOUNTING
Filed Oct. 15, 1956
2 Sheets-Sheet 1
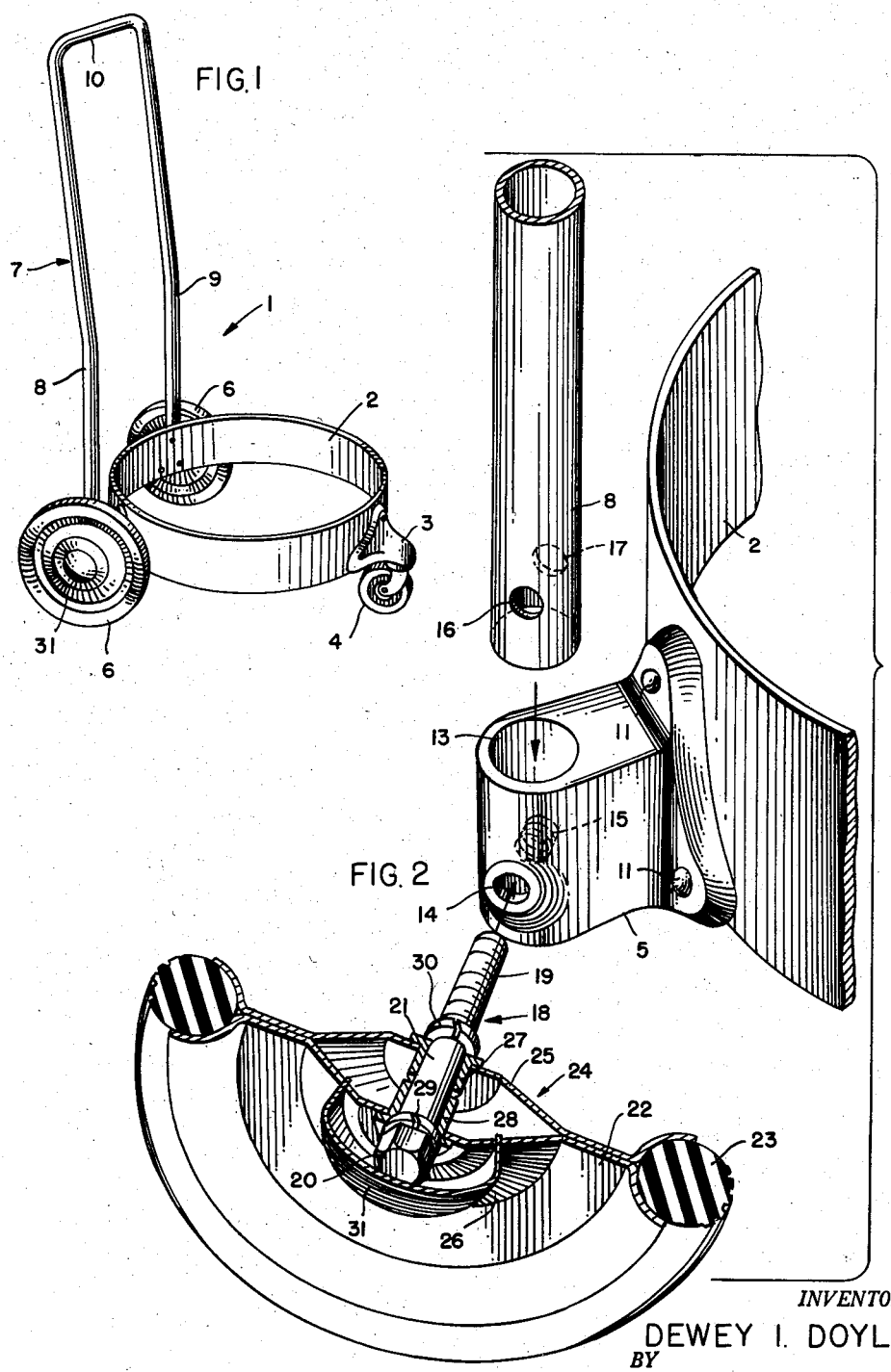
INVENTOR:
DEWEY I. DOYLE, JR.
BY
Marshall, Johnston, Cook & Root.
ATT'YS Jan. 20, 1959    D. I. DOYLE, JR    2,869,885
RIGID AXLE MOUNTING
Filed Oct. 15, 1956    2 Sheets-Sheet 2
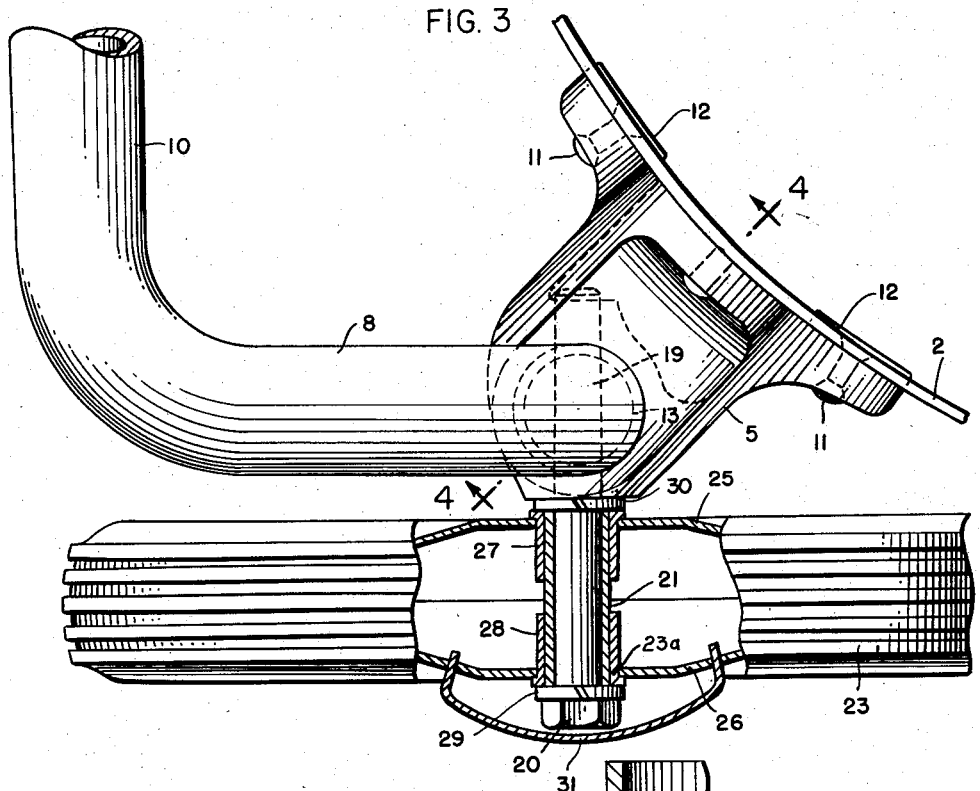
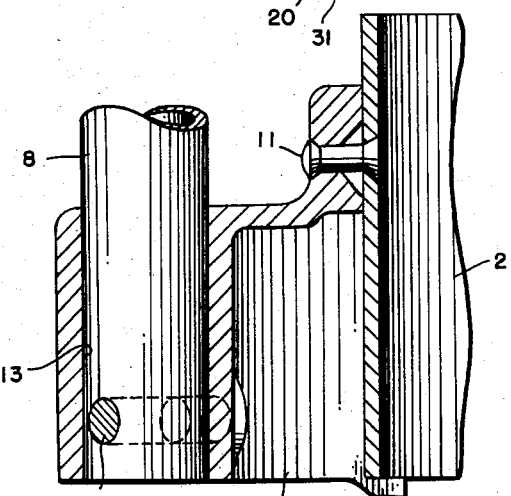
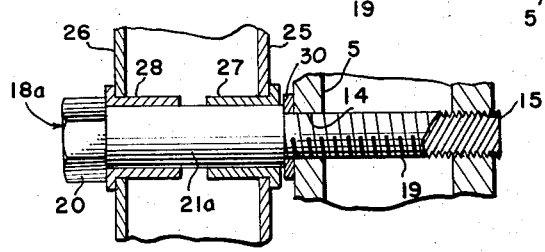
INVENTOR:
DEWEY I. DOYLE, JR.
BY
Marzall, Johnston, Cook & Root.
ATT'YS

United States Patent Office 2,869,885
Patented Jan. 20, 1959

2,869,885
RIGID AXLE MOUNTING

Dewey I. Doyle, Jr., Grand Rapids, Mich., assignor to Doyle Vacuum Cleaner Company, Grand Rapids, Mich., a corporation of Michigan Application October 15, 1956, Serial No. 615,794

5 Claims. (Cl. 280—47.17)

This invention relates in general to rigid axle mountings and is directed more particularly to a novel form of such mounting for the wheels of a dolly.

The axle mounting embodying the present invention is particularly adapted for use in connection with dollies in general, although the broader aspects are not necessarily limited thereto. The invention is useful on any type of wheeled devices.

Heretofore, axle mountings of the wheels of such devices as that disclosed herein required the use of elements which were either expensive to manufacture or required special tools to assemble, or were unsatisfactory from the standpoint of operation and repair. For example, such structures have been devised where threaded bolts were used and wherein a righthand thread was used for one side and a left-hand thread for the other side. Thus, mated pairs had to be made for each device which resulted in a complicated and expensive manufacturing process. In such cases, unless threaded axle supports were pinned or locked in some way, they had a tendency to unscrew.

One more common type of axle utilizes a shaft with a cotter pin extending therethrough. In such a construction, however, the pin may become worn and the shaft is locked only at the points where the pin extends through the shaft rather than around the entire circumference of the shaft.

The use of a shaft and cotter pin reduces the over-all strength of the structure and usually requires flat washers. If the structure is such that the washers can be dispensed with, then the manufacturing expense increases. Again, where a pin is driven through the shaft, in place of a cotter pin, wear and temperature changes might cause the pin to drop out.

In view of the foregoing it is a principal object of the present invention to provide a rigid axle mounting for wheeled devices which is economical to manufacture, is easy to assemble, disassemble and replace parts, and overcomes all of the disadvantages above enumerated.

Another object of the invention is to provide an axle mounting wherein the axle is individual for each wheel and consists either of a spindle or a threaded bolt which is secured in place to a support member, and wherein that portion extending outwardly of the support is so constructed as to form a bearing surface for the wheel.

A further object of the invention is to provide an axle mounting wherein a spindle or bolt is rigidly secured to a support and wherein that portion which is received by a bore in the wheel has an enlarged circumference, either formed as an integral part of the spindle or bolt or as a separate sleeve thereon, and which is clamped between the support and the head on the spindle or shaft so that the portion of enlarged circumference will act as a bearing surface for the wheel.

Still another and more specific object of the invention is to provide an axle support which consists primarily of a threaded bolt having a head thereon with the bolt threadedly engaging a support and having a sleeve on that portion of the bolt within the bore of the wheel wherein the sleeve is slightly longer than the length of the bore, so that when the bolt is tightened into the support, the sleeve will be clamped between the support and the head thereon to act as a bearing surface for the wheel.

Still another and more specific object of the invention is to provide a rigid axle mounting for the wheels of a dolly wherein the dolly is provided with a handle including a pair of spaced leg members, and wherein each leg member is received within a recess of a support member, and wherein the bolt or spindle used as an axle for the wheel also acts to retain the leg member in assembled relation with the dolly.

Other objects and advantages of the invention will become apparent upon reading the following description taken in conjunction with the accompanying drawings, in which Fig. 1 is a perspective view of a dolly illustrating the present invention applied thereto;

Fig. 2 is a fragmentary exploded view in perspective, partly in section, illustrating the primary elements of the invention;

Fig. 3 is a fragmentary plan view, partly in section, showing the parts of the invention in assembled relation;

Fig. 4 is a fragmentary vertical sectional view taken along the plane of line 4—4 of Fig. 3; and Fig. 5 is a detail sectional view of a modified form of my invention.

Referring now more particularly to the drawings, the particular type of dolly to which the invention is applied is indicated by the numeral 1 in Fig. 1, although it will be understood that the form of dolly is not a part of the present invention since the invention may be applied to any suitable type of a wheeled device. The particular dolly shown herein for purposes of illustration comprises a ring member 2 which is adapted to support an article such as a tank or the like. At its forward side the ring 2 may be provided with a caster bracket 3 to which a caster 4 is rotatably secured.

A support member 5 is suitably positioned on the ring 2 for each wheel 6. A handle member generally indicated at 7 may include the spaced apart leg members 8 and 9 having a connecting portion 10 therebetween.

Each of the support members 5 may be secured by any suitable means, such as rivets 11, to the ring 2 and preferably each support is additionally provided with protruding members 12 at the lower edge thereof for the purpose of forming additional support means for the ring 2.

The supports 5 are in mated pairs and to that extent are similarly constructed. Specific parts, however, will be adapted for right and left hand installation so that the axle head will always extend outwardly of the support. As far as the elements of each assembly are concerned, a description of one will suffice for both. The formation of the support 5 may be more clearly understood by reference to Figs. 2, 3 and 4. A vertically extending recess 13 passes through the support and is of substantially the same shape as the cross sectional shape of the leg members 8 and 9 so as to receive those leg members. In the present instance the leg members 8 and 9 are illustrated as tubular and circular in cross section so that the recess 13 is also circular for the reception of the adjacent leg member.

Each support member 5 is also provided with an opening 14 in the outer wall thereof and a threaded opening 15 in the inner wall thereof. The openings 14 and 15 are in direct alignment so that a bolt or spindle may be inserted into the support member 5 and be received by both such openings. Each leg member 8 and 9 is also provided with spaced openings 16 and 17 located at diametrically opposed sides so that when a leg member is inserted in a recess 13 the spindle or bolt forming the axle of the wheel will pass through the outer opening 14 in the support, the two openings 16 and 17 in the leg, and the opening 15 on the inner wall of the support. Thus, the spindle or bolt which forms the axle of the wheel may also be used to rigidly secure the handle 7 of the dolly in place. It will be understood, however, that in the broader application of the present invention, the handle 7 may, if desired, be mounted in any other suitable manner on the dolly, in which case the axle mounting for the wheel may still be utilized with advantage in a support like that indicated by the numeral 5 or in any other type of support where the spindle or bolt may be rigidly secured.

The wheel axle may be either a spindle or a threaded bolt. The use of a bolt is preferable because of the ease with which it may be secured into a threaded opening of the support. Thus, for purposes of illustration, the bolt is indicated generally by the numeral 18 and is shown as having threads 19 at the inner end thereof. The opposite end is provided with a head 20. For a distance inwardly from the head 20 the bolt or spindle has a portion of enlarged circumference which may be formed integral therewith or is preferably provided by means of a sleeve 21. In other words, a shouldered bolt may be used, if desired, as far as the invention is concerned, but the use of a common bolt with a sleeve thereon is more economical to manufacture.

The formation of the wheel forms no part of the present invention since it must have a central bore therethrough for the reception of the axle. In the present case, for purposes of illustration, the wheel consists of two stamped plates and is generally identified by the numeral 22. The periphery of the wheel is shaped to receive a rubber tire 23, if desired, while the hub of the wheel generally indicated at 24 is formed by stamping the central portion of each plate outwardly, as at 25 and 26, and then inserting bushings 27 and 28 into the openings. These bushings 27 and 28 cooperate to form the bore 23a which receives the axle, and which axle consists of either a spindle or bolt as above mentioned.

The sleeve 21 is slightly longer than the length of the bore 23a through the wheel and in the assembled relationship of the parts, the lock washer 29 is provided adjacent the head 20 at one end of the sleeve 21, while a similar lock washer 30 is positioned adjacent the inner end of the sleeve 21. Thus, when the parts are assembled as shown in Fig. 3 and the spindle or bolt tightly engages the support 5, the locker washer 29 will be compressed between the head 20 and the outer end of the sleeve 21. The lock washer 30 will be compressed between the inner end of the sleeve 21 and the support 5. The sleeve 21, therefore, will be securely held or clamped between the head and the support, and since it is preferably slightly longer than the length of the bore through the wheel, the wheel will rotate thereon as a bearing surface.

The same result may be had if a shoulder bolt 18a is used, in which case the sleeve 21 will be dispensed with and in its place the shank of the bolt will be enlarged at 21a for a distance inwardly from the head which is slightly greater than the length of the bore. In that case the lockwasher 29 may be dispensed with but the lock washer 30 will be necessary so that when the bolt is threaded in place into the support 5, the enlarged portion of the shank within the bore 23a of the wheel will be tightly clamped and will act as a bearing surface for the wheel, as shown in Fig. 5.

The simplicity of assembling this axle mounting will be evident. The spindle or bolt, with the sleeve 21 and washer 29 thereon, is first inserted through the bore in the wheel, the washer 30 added thereto and the entire assembly mounted on the support by inserting the bolt therethrough and threading it into the threaded opening 15. All that is necessary is a simple wrench to tighten the assembly and the wheel will rotate freely on the sleeve or on the enlarged portion of the shank if it is a shoulder bolt.

Suitable slots may be formed in the hub 26 on the outer side of the wheel to receive the ears of a cap member 31 so that the bolt or spindle head will be concealed.

In the preferred form of the invention the leg members of the handle will also be secured in place by the axle mounting through the support member. The structure embodying the present invention, therefore, has the advantage that it can be shipped knocked down and the purchaser can easily assemble it. The leg members 8 and 9 will be inserted into the respective supports 5 with the holes therein in alignment with the holes 14 and 15 in the support and after the bolt has been inserted through the support and the leg member and thereafter tightened, the entire dolly will be completely assembled. It will be understood that the holes 14 and 15 will extend in the opposite direction in the mating support and the threads therein will be reversed. When, however, a spindle is secured in the support in some other manner, it may be possible to make the two supports identical.

The present invention also has the advantage that no adjustment is required for the tightening of the spindle or bolt because the spacing is fixed by the sleeve or by the portion of enlarged diameter if a shoulder bolt is used. The use of the lock washers further simplifies the construction because in their compressed condition they will also act as flat washers even though they still have a locking function. The use of a sleeve as described above instead of a shoulder bolt has the additional advantage that standard bolts can be used and the sleeve can then be made as thick-walled as desired, and only one extra lock washer is needed. Thus, since the sleeve is the only part of the assembly which is not standard, it will be evident that the cost of manufacture will be minimized as well as the time necessary in assembling the parts.

It will be evident furthermore that with the rigid axle mounting as described herein, the bolt may be inserted into a void or socket to hold another member, such as the handle shown herein, or it may be inserted through the wall of any rigid member.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. In combination with a dolly having a handle thereon with spaced leg members, a rigid axle mounting for each wheel thereon comprising, a support member on the dolly, a recess in said support member receiving one of the leg members of said handle, a wheel adjacent said support member having a central bore therethrough, a headed spindle extending through said bore and said one leg member and secured within said support, and a portion of enlarged diameter on that part of said spindle within said bore and having a length greater than the length of said bore, whereby said portion of enlarged diameter will be clamped between said support member and the head of said spindle, when said bolt is tightened, and form a bearing surface for the wheel.

2. In combination with a dolly having a handle thereon with spaced leg members, a rigid axle mounting for each wheel thereon comprising, a support member on the dolly, a recess in said support member receiving one of the leg members of said handle, a wheel adjacent said support member having a central bore therethrough, a headed spindle extending through said bore and said one leg member and secured within said support, and a sleeve on that part of said spindle within said bore, said sleeve being longer than the length of said bore, whereby said sleeve is clamped between said support member and the head of said spindle and forms a bearing surface for the wheel when said spindle is secured in said support.

3. In combination with a dolly having a handle thereon with spaced leg members, a rigid axle mounting for each wheel thereon comprising, a support member on the dolly having a threaded opening therein, a recess in said support member receiving one of the leg members of said handle, a wheel adjacent said support member having a central bore therethrough, a headed bolt extending through said bore and said one leg member and threadedly engaging the opening in said support member, and a portion of enlarged diameter on that part of said bolt within said bore and having a length greater than the length of said bore, whereby said portion of enlarged diameter will be clamped between said support member and the head of said bolt when said bolt is tightened and form a bearing surface for the wheel.

4. In combination with a dolly having a handle thereon with spaced leg members, a rigid axle mounting for each wheel thereon comprising, a support member on the dolly having a threaded opening therein, a recess in said support member receiving one of the leg members of said handle, a wheel adjacent said support member having a central bore therethrough, a headed bolt extending through said bore and said one leg member and threadedly engaging the opening in said support member, and a sleeve on that part of said bolt within said bore, said sleeve being longer than the length of said bore, whereby said sleeve will be clamped between said support member and the head of said bolt when said bolt is tightened and form a bearing surface for the wheel.

5. In combination with a dolly having a handle thereon with spaced leg members, a rigid axle mounting for each wheel thereon comprising, a support member on the dolly having a threaded opening therein, a recess in said support member receiving one of the leg members of said handle, a wheel adjacent said support member having a central bore therethrough, a headed bolt extending through said bore and said one leg member and threadedly engaging the opening in said support member, a sleeve on that part of said bolt within said bore, said sleeve being longer than the length of said bore, and a pair of lock washers on said bolt, one adjacent each end of said sleeve, whereby said sleeve will be clamped between the support and washer at one end thereof and the head of said bolt and the washer at the other end thereof when said bolt is tightened and form a bearing surface for the wheel.

References Cited in the file of this patent

UNITED STATES PATENTS

| | | |
|---|---|---|
| 770,355 | Cox et al. | Sept. 20, 1904 |
| 1,008,875 | Tennison | Nov. 14, 1911 |
| 1,581,061 | Johnston | Apr. 13, 1926 |
| 2,078,119 | Benedict | Apr. 20, 1937 |
| 2,582,435 | Howard | Jan. 15, 1952 |

FOREIGN PATENTS

| | | |
|---|---|---|
| 452,890 | France | Mar. 20, 1913 |